US012164075B2

(12) United States Patent
Wiltshire et al.

(10) Patent No.: US 12,164,075 B2
(45) Date of Patent: Dec. 10, 2024

(54) AUTO-GENERATED TRANSGRESSIVE SYSTEMS TRACT MAPS

(71) Applicant: Landmark Graphics Corporation, Houston, TX (US)

(72) Inventors: Marcus David Michael Wiltshire, Grove (GB); Duncan Charles Hay, Bristol (GB); Dominic Allan Rorke, Brightwell-cum Sotwell (GB)

(73) Assignee: Landmark Graphics Corporation, Houston, TX (US)

( * ) Notice: Subject to any disclaimer, the term of this patent is extended or adjusted under 35 U.S.C. 154(b) by 384 days.

(21) Appl. No.: 17/622,230

(22) PCT Filed: Jul. 11, 2019

(86) PCT No.: PCT/US2019/041277
§ 371 (c)(1),
(2) Date: Dec. 22, 2021

(87) PCT Pub. No.: WO2021/006902
PCT Pub. Date: Jan. 14, 2021

(65) Prior Publication Data
US 2022/0350047 A1    Nov. 3, 2022

(51) Int. Cl.
*G01V 20/00*    (2024.01)
*G06F 16/29*    (2019.01)
*G06F 16/909*   (2019.01)

(52) U.S. Cl.
CPC ............. *G01V 20/00* (2024.01); *G06F 16/29* (2019.01); *G06F 16/909* (2019.01)

(58) Field of Classification Search
CPC ........ G01V 20/00; G06F 16/909; G06F 16/29
See application file for complete search history.

(56) References Cited

U.S. PATENT DOCUMENTS 11,353,620 B2 * 6/2022 Jiang ................. G01V 11/002
11,644,589 B2 * 5/2023 Le Guern ............. G01V 1/282
                                                     702/16

(Continued)

FOREIGN PATENT DOCUMENTS

WO     2018217875 A1    11/2018

OTHER PUBLICATIONS

Dim et al., Petroleum System Elements within the Late Cretaceous and Early Paleogene Sediments of Nigeria's Inland Basins: An Integrated Sequence Stratigraphic Approach, Journal of African Earth Sciences, vol. 130, Jun. 2017, pp. 76-86.

(Continued)

*Primary Examiner* — Elias Desta
(74) *Attorney, Agent, or Firm* — Kilpatrick Townsend & Stockton LLP

(57) ABSTRACT

A computer-implemented method is provided for processing gross depositional environment (GDE) maps. The method includes receiving end-member lowstand systems tract (LST) and maximum flood surface (MFS) gross depositional environment (GDE) maps that represent a particular geographic area at different respective times spaced by a time interval, processing both of the LST and MFS GDE maps in accordance with a predefined set of rules that use geoprocessing operations to relate the content of both the LST and MFS GDE maps, and outputting a transgressive system tract (TST) map based on the processing.

18 Claims, 13 Drawing Sheets

(56) References Cited

U.S. PATENT DOCUMENTS

2015/0241591 A1    8/2015  Burmester et al.
2015/0316670 A1   11/2015  Kowalik et al.
2018/0267205 A1    9/2018  Harris et al.

OTHER PUBLICATIONS

International Application No. PCT/US2019/041277, International Search Report and Written Opinion mailed on Apr. 10, 2020, 10 pages.

\* cited by examiner

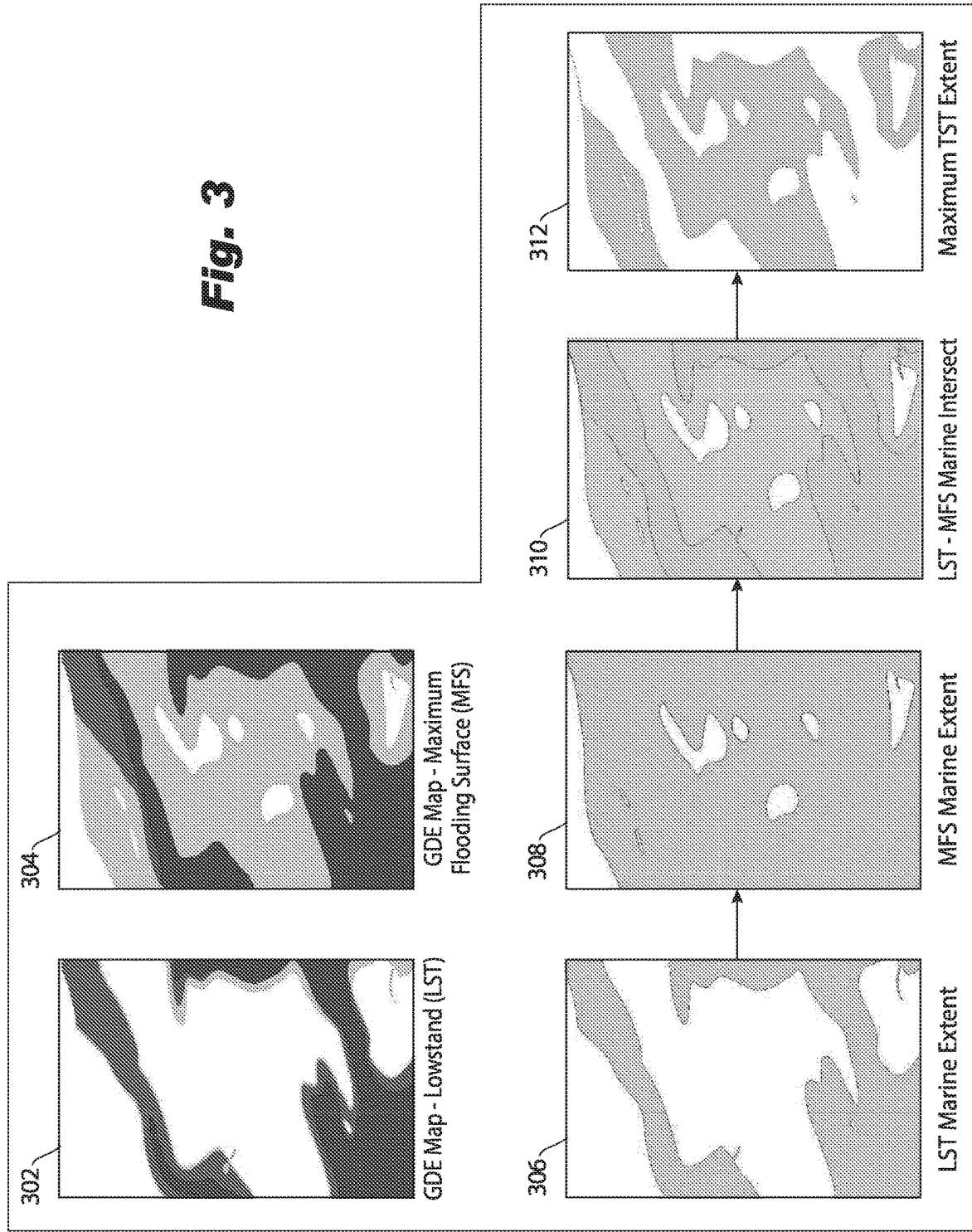

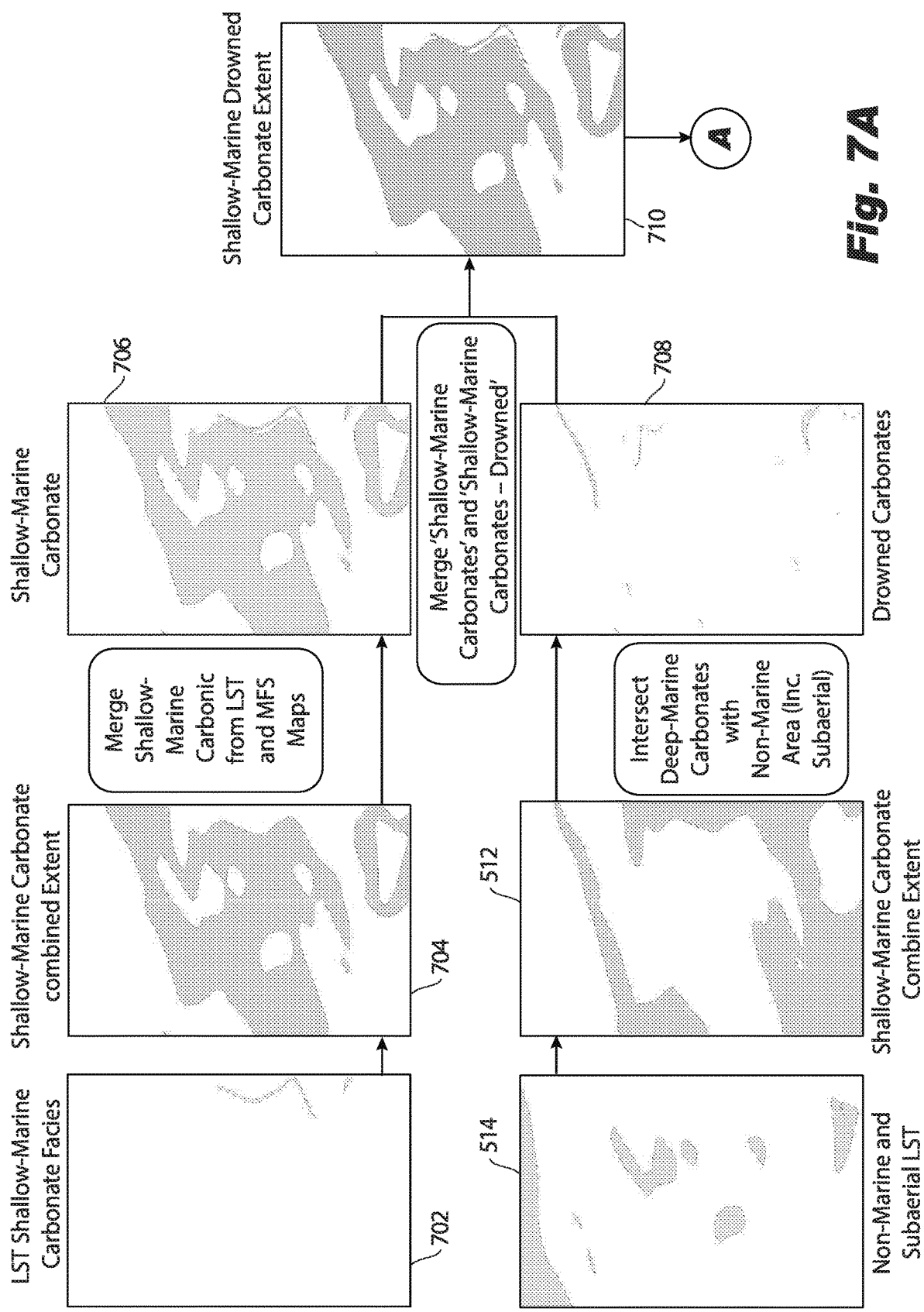

AUTO-GENERATED TRANSGRESSIVE SYSTEMS TRACT MAPS

TECHNICAL FIELD OF THE DISCLOSURE

The embodiments disclosed herein generally relate to gross depositional environment (GDE) input for hydrocarbon screening and, more particularly, to methods of systematically generating reproducible GDE input with transgressive system tract maps for hydrocarbon screening.

BACKGROUND OF THE DISCLOSURE

A key workflow in hydrocarbon exploration is the screening of areas of the world for the presence and effectiveness of petroleum system elements (source, reservoir and seal rocks). This process helps organizations develop an understanding of areas of the globe with future exploration potential for oil and gas, which enables effective exploration at local sites.

When screening, gross depositional environment (GDE) maps provide primary input data for assessing presence of petroleum system elements. GDE maps provide a 2D spatial representation of sediment deposited during a predefined time interval. When drawn in a sequence stratigraphic context, a time interval is represented by two end-member maps depicting respective environments during relative sea-level high, also referred to as maximum flooding surface (MFS), and relative sea-level low, also referred to as lowstand systems tract (LST).

However, when the two end-member GDE maps are used to assess the presence of petroleum system elements, interstitial rocks between these two end-members referred to as transgressive systems tract (TST), are not represented. This gap in information results in missing significant extents of an existing petroleum system in a 2D map of the environment, which impacts the ability to appropriately assess risk and validity of the petroleum system. Attempts to manually estimate TST extents depend on individual interpretations and are subject to errors, inaccuracy, and unacceptable variability.

Data representing estimated TST extents can be provided as input to a tool for screening for petroleum system elements. However, inaccuracies in the data representing the TST extents can be propagated into output from the screening tool and magnified, interfering with the effectiveness of exploration that depends on the screening tool output.

While conventional methods and systems have generally been considered satisfactory for their intended purpose, there is still a need in the art for a system and method to systematically determine TST with improved accuracy, consistency, and reproducibility.

BRIEF DESCRIPTION OF THE SEVERAL VIEWS OF THE DRAWING

The accompanying appendices and/or drawings illustrate various non-limiting, example, inventive aspects in accordance with the present disclosure:

FIG. 3 shows a series of example maps that illustrate maps processed during a first stage of an example method executed by a TST extent generator in accordance with embodiments of the disclosure;

DETAILED DESCRIPTION OF THE DISCLOSED EMBODIMENTS

Figure 1:
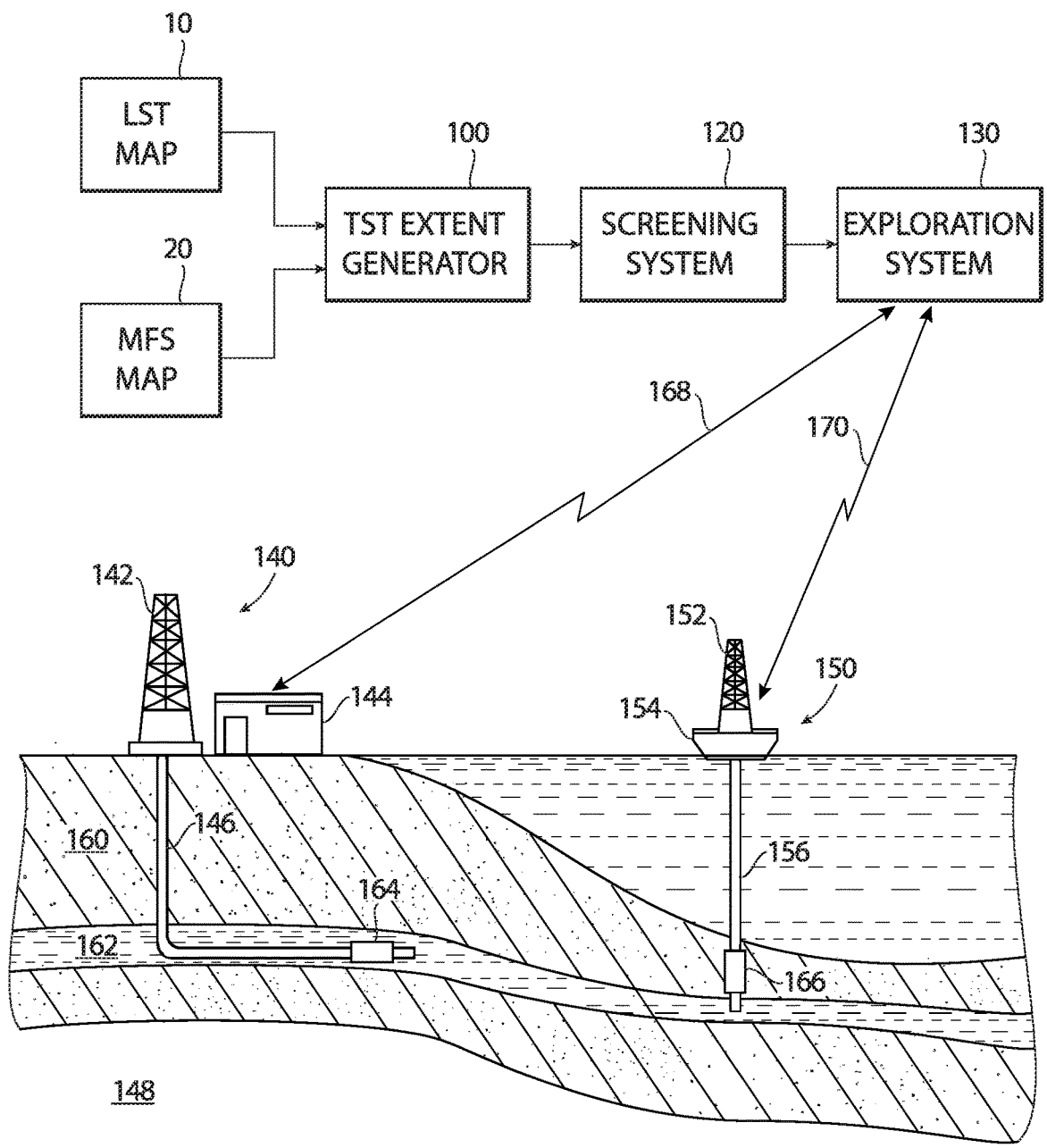
FIG. 1 illustrates example lowstand systems tract (LST) and maximum flooding surface (MFS) maps provided as gross depositional environment (GDE) inputs to a transgressive system tract (TST) generator in accordance with the embodiments of the disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

A system and method are provided for analyzing end-member gross depositional environment (GDE) maps to accurately estimate lithology and age of different portions of interstitial rock in the area between the sediment deposits represented by the end-member GDEs. GDE maps provide a two-dimensional representation of sediment deposited over a time interval. When drawn in a sequence stratigraphic context, the end-member maps correspond to low and high sea levels over the time interval. The relative sea level low corresponds to a lowstand systems tract (LST) map, and the relative sea level high corresponds to a maximum flooding surface (MFS) map.

It will be understood that the terms "screening" or "exploration" are not intended to limit the use of the structures and processes described in connection with those terms to a particular type of screening or exploration or a particular subterranean environment, as the illustrated embodiments of the present disclosure encompass screening and/or exploration of any suitable subterranean environment, including, but not limited to any geologic environment that includes a sedimentary basin, a seabed, a reservoir, one or more fractures, etc. The terms also encompass screening and exploration for natural gas wells or hydrocarbon wells in general. Further, such wells can be used for drilling, production, monitoring, or injection in relation to the recovery of hydrocarbons or other materials from the subsurface. This could also include geothermal wells intended to provide a source of heat energy instead of hydrocarbons. It is to be understood the illustrated embodiments relate to screening for subterranean exploration and/or subterranean exploration and, can further relate to apparatus and methods for guiding, controlling, and/or performing drilling, monitoring and/or processing of wellbore data from subterranean operations.

Turning now descriptively to the drawings, in which similar reference characters denote similar elements throughout the several views, FIG. 1 shows a TST extent generator 100 provided in an example operational environment. TST extent generator 100 is a computer system configured to receive input LST map 10 and MFS map 20, determine a TST extent, provide the TST extent as input to a screening system 120, which can, in turn, provide screening outputs to an exploration system 130. The exploration system 130 can further guide, control or perform drilling, monitoring and/or processing of wellbore data from subterranean operations.

The subterranean operations that are guided, controlled, performed, monitored and/or processed by the exploration system 130 may take place at an onshore location or site 140 as well as an offshore location or site 150. The onshore site 140 may have a rig 142 and a rig control system 144, among other things. The rig control system 144 may be used to operate the rig 142 to perform one or more of the subterranean operations. These subterranean operations may include rotating a drill string 146 to drill through a subterranean formation 148. Likewise, the offshore site 150 may have, among other things, a rig 152 mounted on a drill ship 154. The drill ship 154 may be used to operate the rig 152 to perform one or more of the subterranean operations, such as rotating a drill string 156 to drill through the subterranean formation 148.

The subterranean formation 148 may include one or more strata or layers, one which is indicated at 160. These layers 160 may include a hydrocarbon reservoir 162, among other things. Various sensor packages 164 may be mounted on the drill string 146 of the rig 142 to obtain data about these layers 160. Similar sensor packages 166 may be mounted on the drill string 156 of the rig 152 to obtain data about the various layers 160. Although not expressly shown, one or more sensor packages may be located on or near the surface of the formation 148 instead of or in addition to the drill strings 146, 156. The various sensor packages 164, 166 may include seismic sensors, electromagnetic sensors, temperature sensors, pressure sensors, depth sensors, and other sensors known to those skilled in the art.

A portion of the drill string 146, 156 may be operated to drill horizontally through the layers 160 in some cases in order to access the hydrocarbon reservoir 162. In such horizontal drilling operations (and other operations), lateral variations in formation properties, stresses, and other formation properties need to be assessed and analyzed by the exploration system 130 in order to assist with planning and executing the operations. Communication between the exploration system 130 and the onshore site 140 and offshore site 150, indicated respectively at 168 and 170, may be accomplished using any communication protocols known to those skilled in the art, including landline protocols, cellular protocols, as well as satellite protocols.

In a similar manner, TST extent generator 100, screening system 120 and exploration system 130 are configured to communicate with each other in any suitable way, such as, for example, via a public communication network such as the Internet, via a private network, or a combination of public and private networks. The TST extent generator 100, screening system 120, and exploration system are only one example of a suitable system and is not intended to suggest any limitation as to the scope of use or functionality of embodiments of the disclosure described herein. Regardless, TST extent generator 100, screening system 120, and exploration system are capable of being implemented and/or performing any of the functionality set forth herein.

The screening system 120 is a computer system that can output improved information and/or make improved decisions to perform exploration screening using improved, reliable TST extent input data received from TST extent generator 100. The screening system 120 may include features of a commercially available framework, such as FAIRWAYFINDER™ cloud-hosted screening tools (Halliburton Energy Services, Inc. Houston Tex.) or other such screening tools. It is noted these tools are preferably utilized in the early stages of the hydrocarbon exploration cycle, allowing the user to assess petroleum potential on a global to basin scale.

The exploration system 130 can include computers, drilling platforms, drilling equipment, etc., that can be controlled or make decisions based on input from the screening system 120. The exploration system 130 can output improved information and/or make improved decisions to plan and/or perform explorations, allocate and/or control exploration equipment due to the improved input provided by the screening system 120. Accordingly, the TST extent generator 100 performs a method that provides a technological improvement to screening for hydrocarbon exploration and hydrocarbon exploration.

It will further be appreciated that the illustrated embodiment of FIG. 1 is scalable to aggregate and analyze GDE maps from any global region to generate and display output TST extent maps in a readily discernible computerized graphic displayed format.

Figure 2:
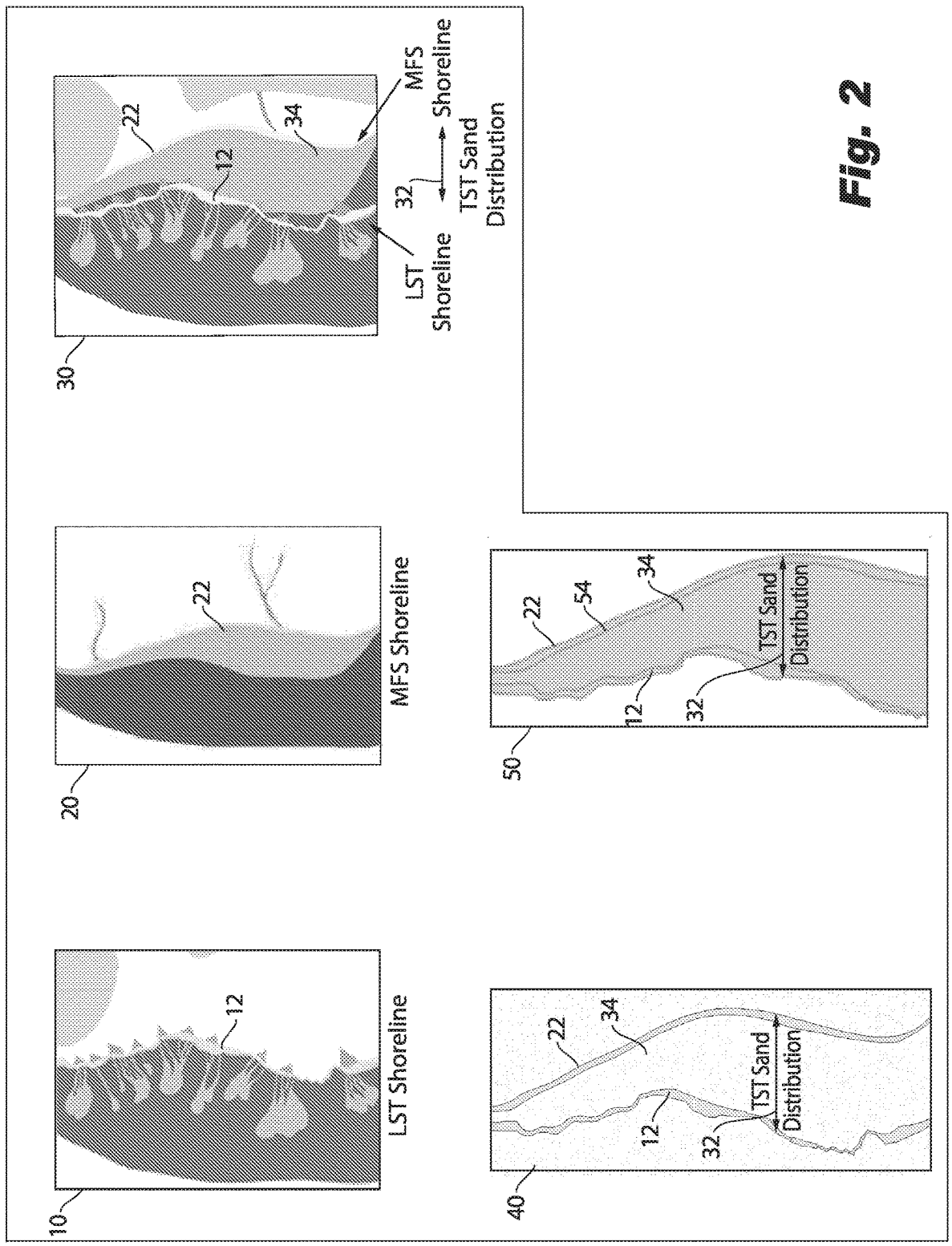
FIG. 2 shows a TST extent generator provided in an operational environment for receiving input LST and MFS maps and providing a TST extent as input to a screening system in accordance with the embodiments of the disclosure.

FIG. 2 illustrates the maps 10 and 20 that show respective LST and MFS map inputs to a TST generator. Map 10 includes a first polygon 12 that represents interstitial rock, also referred to as sand, at an edge of coastline for a specified time interval at a relative sea level low. Information other than polygon 12 is not relevant to the disclosure's explanation of the distribution of the transgressive systems tract, and is therefore treated as extraneous information.

Map 20 includes a second polygon 22 that represents sand at an edge of coastline for the specified time interval at a relative sea level high. Comparing first and second polygons 12 and 22, it is illustrated that second polygon 22 has transitioned in-land relative to first polygon 12 as a result of proportional sea-level rise Map 30 shows maps 10 and 20 combined, showing the TST extent 34 (indicated by arrow 32) that is bounded by first and second polygons 12 and 22, for which information about interstitial rock is missing from map 30. Map 40 includes only the first and second polygons 12 and 22 as extracted from map 30, with extraneous information eliminated. Thus, map 40 shows clearly how information about interstitial rock in the TST extent 34 (indicated by arrow 32) is missing.

Map 50 is an auto-generated TST map, which is similar to map 40, showing first and second polygons 12 and 22 with extraneous information that is not relevant removed. However, TST map 50 further includes an interstitial TST extent 54 (also referred to as a TST extent) that includes information relevant to hydrocarbon exploration, such as indicated by at least one auto-generated polygon in the TST extent 34. The TST map 50 is auto-generated based on a set of rules in accordance with the disclosed system and method. Another example, TST map 908 is shown and described with respect to FIG. 9 in which the TST extent includes an example of multiple polygons that were generated using the disclosed system and method. The TST maps 50 and 908 are generated using geoprocessing methods and a suite of sequence stratigraphic principles to process, e.g., including querying and manipulating inputs (LST and MFS maps, such as LST map 10 and MFS map 20) in a specified order. The resulting TST maps, such as TST maps 50 and 908, include a TST extent that is intelligently attributed based on the input composition of the input LST and MFS maps 10 and 20. The TST maps can include a set of polygons that can be attributed to a relevant age and lithology.

Using the disclosed set of rules, described in greater detail below with respect to FIGS. 3-10 and the corresponding description, a TST extent is generated that uses content of the input LST map 10 and MFS map 20 to intelligently and methodically determine, using content of the LST map 10 and MFS map 20, the maximum TST extent, including areas that are only carbonate extent, only clastic extent, or a mixture of clastic and carbonate. The TST extent is reproducible by following the disclosed method, providing predictability and reliability. Relative to previous attempts to provide data about a TST extent, the disclosed method provides improved and reliable data that can be reproduced and reliably compared to other data for making decisions about screening for exploration or performing exploration. The disclosed system and method generated improved input data to other systems for screening for exploration or performing exploration. The improved input data is a technological improvement that can further improve the screening and/or exploration processes.

A key workflow in hydrocarbon exploration is exploration potential screening, which screens areas of the world for the presence and effectiveness of petroleum system elements (source, reservoir, and seal rocks). Information gleaned from the screening process helps to indicate which areas of the globe have potential for future exploration of oil and gas. Thus, exploration can be targeted to areas that have the best potential, reducing or minimizing wasted exploration of areas with little or no potential. Such exploration potential screening can be performed at different scales, such as at a global scale or at a basinal scale.

FIGS. 3, 5, 7, and 9 each shows a series of example maps that illustrate respective first through fourth stages of the disclosed method as performed by a TST extent generator, such as the TST extent generator 100 shown in FIG. 2. FIGS. 4, 6, 8, and 10 each shows a flowchart that illustrates example operations of the respective first through fourth stages of the disclosed method as performed by a TST extent generator, such as the TST extent generator 100 shown in FIG. 2.

Before turning to description of FIGS. 4, 6, 8, and 10, it is noted that the flowchart in FIGS. 4, 6, 8, and 10 each show an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, one or more of the steps can be omitted.

Figure 4A:
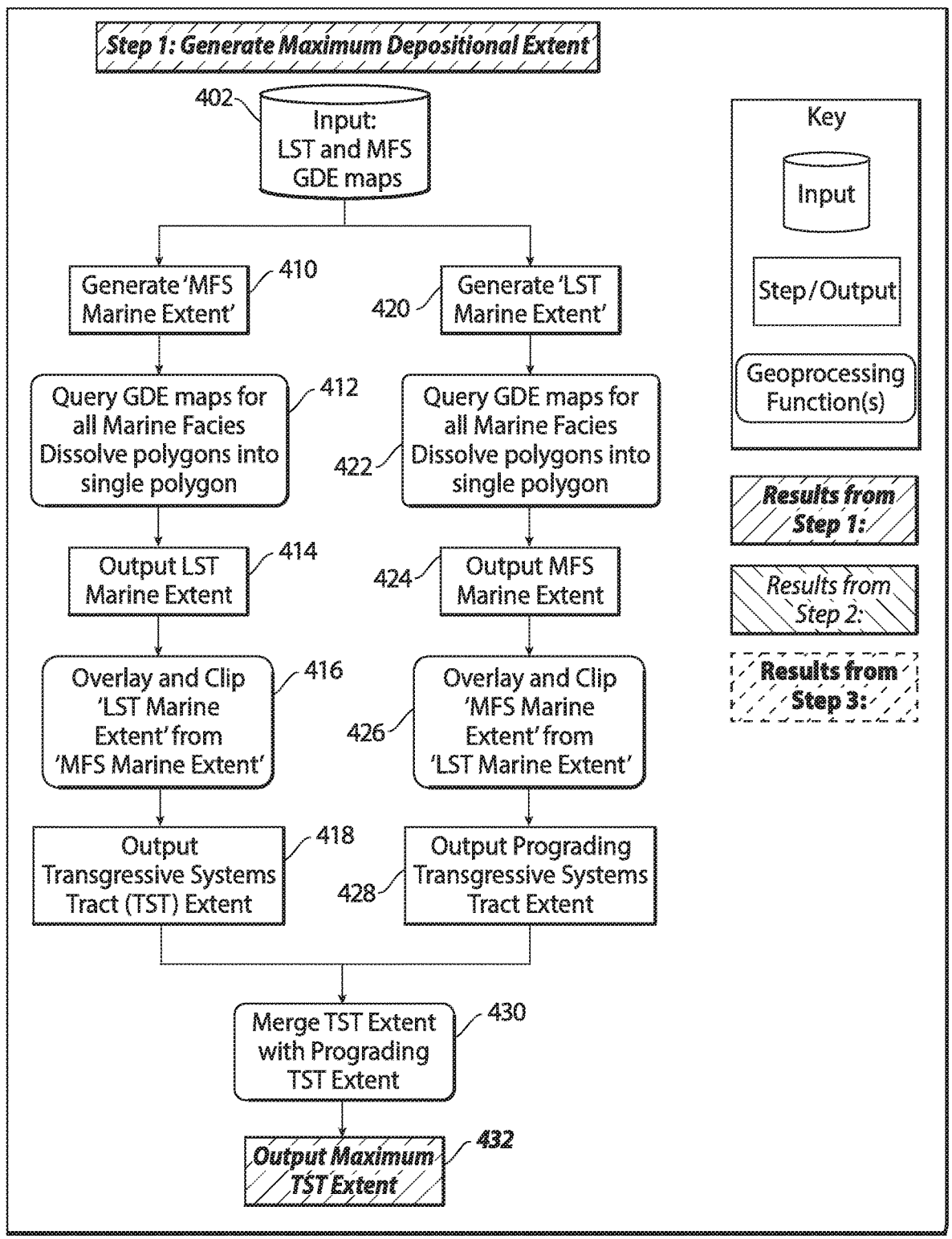
FIG. 4A shows a flowchart of example operations performed by the TST extent generator during the first stage of the example method executed by the TST extent generator in accordance with embodiments of the disclosure.

FIG. 3 shows a series of example maps that illustrate the first stage of the disclosed method, and FIG. 4 shows a flowchart of example operations of the first stage of the disclosed method. With reference to FIG. 3, example input LST map 302 and MFS map 304 are shown, each including a variety of polygons having different shading, each shading indicating a different lithology (and therefore associated depositional environment). In the first stage, the input LST and MFS maps 302, 304 are queried for relevant facies and dissolved to form a single polygon, after which a non-intersecting area of the dissolved polygons are determined.

Map 306 shows an LST marine extent that is the result of querying the input LST map 302 for marine facies and dissolving all polygons to form one polygon. Map 308 shows an MFS marine extent that is the result of querying the input MFS map 304 for marine facies and dissolving all polygons to form one polygon. Map 310 shows an LST-MFS marine intersect that is formed by intersecting maps 304 and 308 by performing clip overlay and clip processes. Map 312 shows a maximum TST extent, which is the output result from the intersect shown in map 310 showing areas of map 308 that do not intersect the areas of map 306.

With reference to FIG. 4, at operation 402 input LST and MFS maps (e.g., LST and MFS maps 302, 304) are received. As used herein, receiving input can include receiving input in response to a request, retrieving input, accessing input, reading input, or otherwise obtaining the input. Operations 410-418 are performed to output map 306 with LST marine extent (see operation 414) and operate on map 308 with MFS marine extent. Operations 420-428 are performed to output map 308 (see operation 424) with MFS marine extent and operate on map 306 with LST marine extent.

More specifically, at operation 410 a task to generate LST marine extent operation is initiated by accessing the LST map 302. At operation 412 a geoprocessing function is performed to query the LST GDE map (LST map 302) for all marine facies and dissolve the resulting polygons into a single polygon. At operation 414, a result of querying the LST map 302 is output as the LST marine extent, such as shown by map 306. At operation 416 the LST marine extent is overlaid by the MFS marine extent (map 424), and is clipped by removing intersecting portion of the maps for the MFS and LST marine extents generated at operations 424 and 414. The result of operation 416 is output at operation 418 as the TST extent.

At operation 420 a generate MFS marine extent operation is initiated, which includes accessing MFS map 304 At operation 422, a geoprocessing function is performed to query the GDE map (MFS map 304) for all marine facies and dissolve the resulting polygons into a single polygon. At operation 424, a result of querying the MFS map 304 is output as the MFS marine extent, such as shown in map 308. At operation 426 the MFS marine extent is overlaid by the LST marine extent, and is clipped by removing intersecting portion of the maps for the MFS and LST marine extents generated at operations 424 and 414, respectively, leaving an area of the map for the LST extent that does not intersect the map for the MFS extent. The result of operation 426 is output at operation 428 as prograding transgressive systems tract extent. The prograding transgressive systems tract indicates areas where, despite a rise in relative sea-level between the LST and MFS maps, land is not transgressed but instead exposed during this period, typically due to external factors including uplift due to plate tectonics. Therefore potential reservoir facies could be deposited more distally, rather than proximally, to the LST shoreline. Accordingly, the output at operation 428 is configured to capture information about such depositions.

Figure 4B:
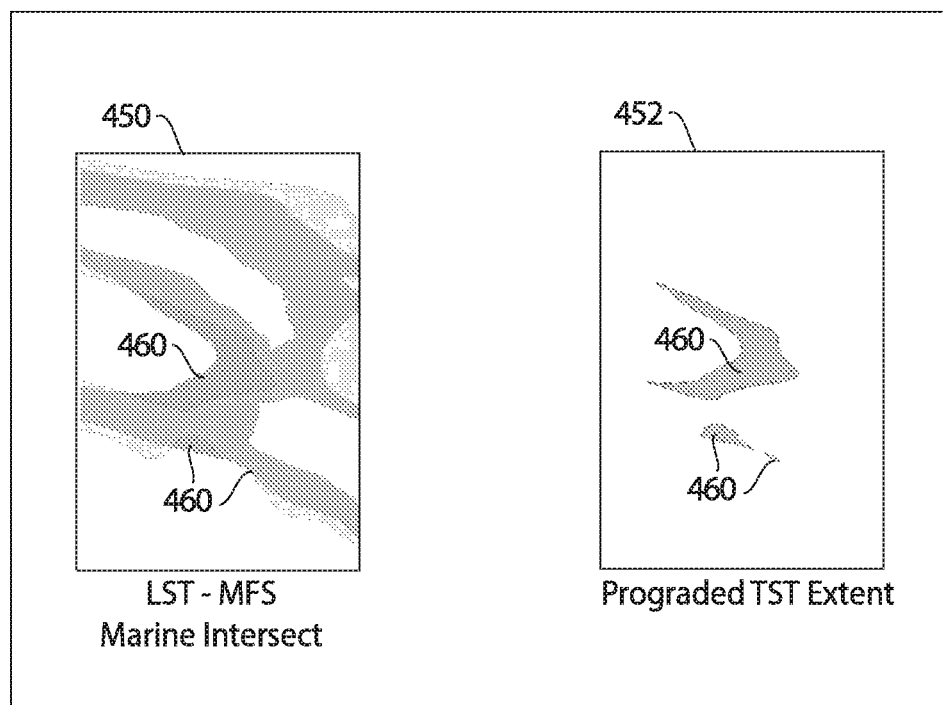
FIG. 4B shows example maps that illustrate determination of a prograded extent.

FIG. 4B shows maps 450 and 452, based on a set of end-member maps, not shown, that illustrate output of operations 426 and 428, respectively. Areas 460 represent portions of the LST extent that do not intersect the map for the MFS extent and correspond to a prograding extent.

At operation 430 the output of operations 418 and 428 are merged. At operation 432, the maximum TST extent, such as shown by example map 312, is output, such as shown in map 312.

Figure 5:
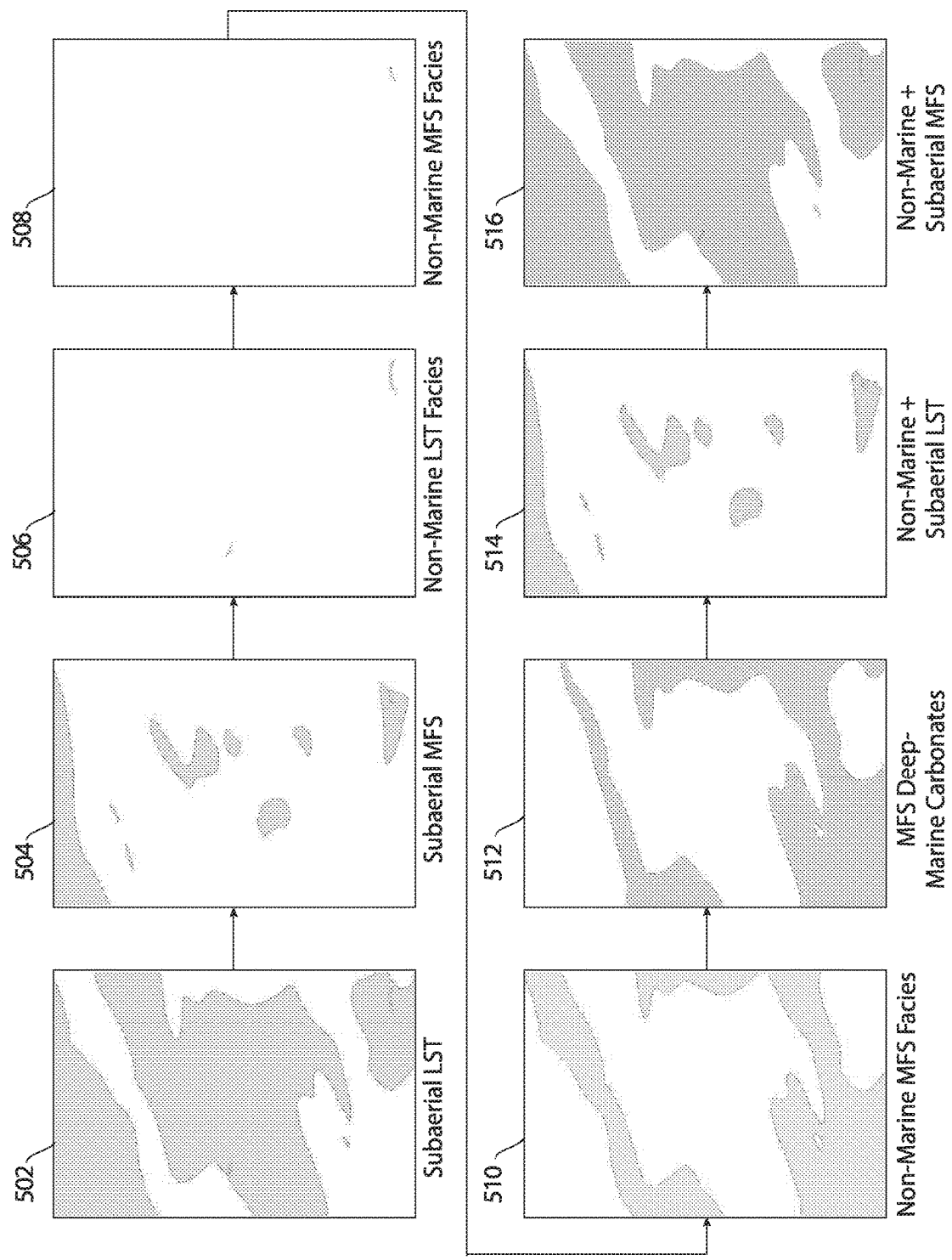
FIG. 5 shows a series of example maps that illustrate maps processed during a second stage of the example method executed by a TST extent generator in accordance with embodiments of the disclosure.
Figure 6:
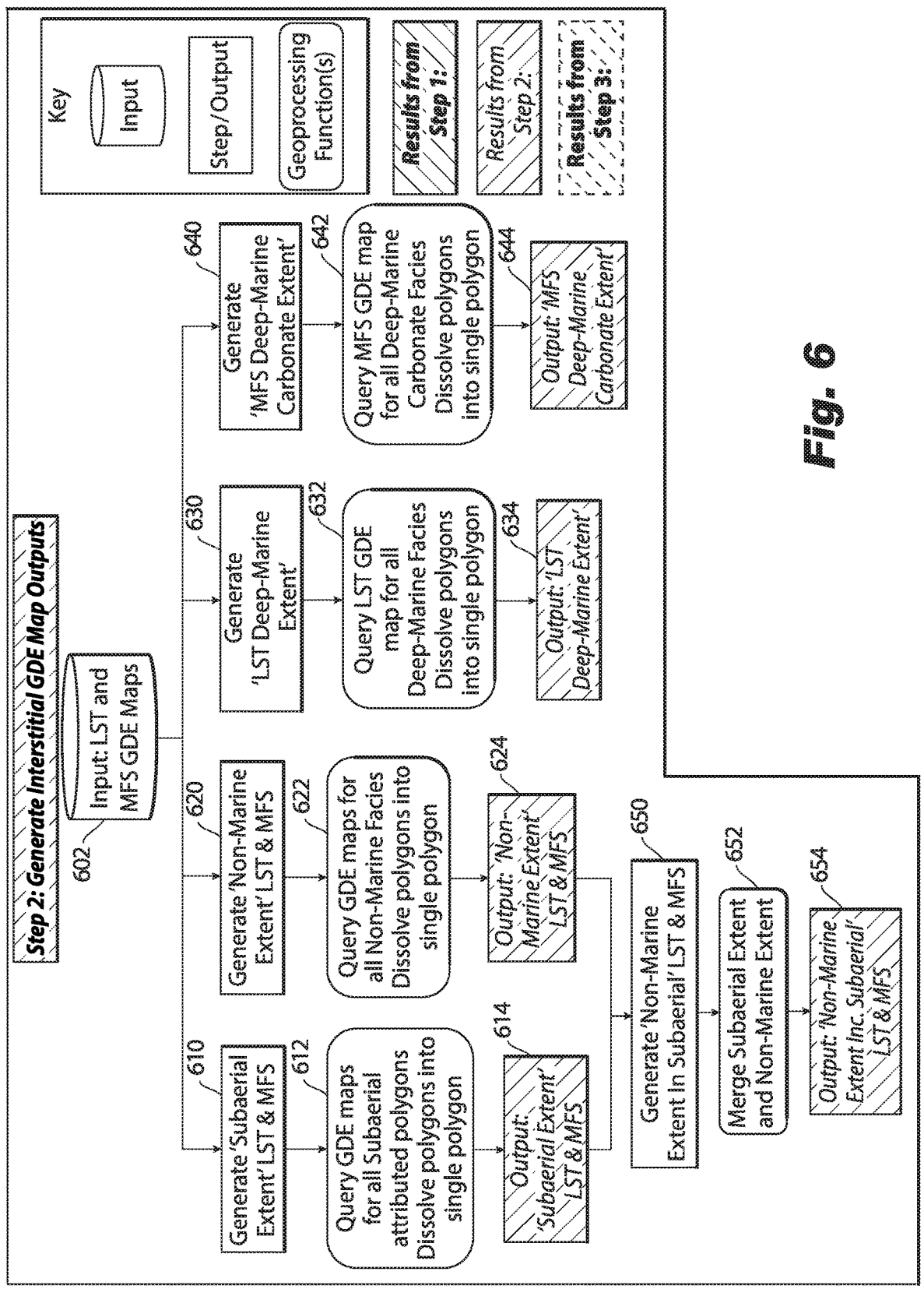
FIG. 6 shows a flowchart of example operations performed by the TST extent generator during the second stage of the example method executed by the TST extent generator in accordance with embodiments of the disclosure.

FIG. 5 shows a series of example maps that illustrate the second stage of the disclosed method, and FIG. 6 shows a flowchart of example operations of the second stage of the disclosed method. At the second stage, the MFS and LST maps 302 and 304 are queried for relevant facies and resulting polygons of each respective query is dissolved into a single polygon, which is then further processed and/or provided to the third stage for further processing. The result of each query output With reference to FIG. 5, map 502 shows an LST subaerial extent that is the result of querying the input LST map 302 for subaerial facies and dissolving all polygons to form one polygon. Map 504 shows an MFS subaerial extent that is the result of querying the input MFS map 304 for subaerial facies and dissolving all polygons to form one polygon.

Map 506 shows an LST non-marine extent that is the result of querying the input LST map 302 for non-marine facies and dissolving all polygons to form one polygon. Map 508 shows an MFS non-marine extent that is the result of querying the input MFS map 304 for non-marine facies and dissolving all polygons to form one polygon.

Map 510 shows an LST deep-marine extent that is the result of querying the input LST map 302 for deep-marine facies and dissolving all polygons to form one polygon. Map 512 shows an MFS deep-marine extent that is the result of querying the input MFS map 304 for deep-marine facies and dissolving all polygons to form one polygon.

Map 514 shows a map of merged LST non-marine and subaerial extent, which is the result of merging maps 502 and 506. Map 516 shows a map of merged MFS non-marine and subaerial extent, which is the result of merging maps 504 and 508.

With reference to FIG. 6, at operation 602 input LST and MFS maps (e.g., LST and MFS maps 302, 304) are received. At operation 610, an action is initiated for generating subaerial extents from respective LST map 302 and MFS map 304. At operation 612, a geoprocessing function is performed to query the GDE maps (LST and MFS maps 302, 304) for subaerial attributed polygons, and dissolve the resulting polygons into a single polygon. At operation 614, a result of querying the LST and MFS maps 302, 304 is output as the respective LST subaerial extent and the MFS subaerial extent, such as shown by maps 502 and 504.

At operation 620, an action is initiated for generating non-marine extents from respective LST map 302 and MFS map 304. At operation 622, a geoprocessing function is performed to query the GDE maps (LST and MFS maps 302, 304) for non-marine polygons, and dissolve the resulting polygons into a single polygon. At operation 624, a result of querying the LST and MFS maps 302, 304 is output as the respective LST non-marine extent and the MFS non-marine extent, such as shown in maps 506 and 508.

At operation 630, an action is initiated for generating a deep-marine LST extent from LST map 302. At operation 632 a geoprocessing function is performed to query the LST map 302 for deep-marine polygons, and dissolve the resulting polygons into a single polygon. At operation 634, a result of querying the LST map 302 is output as the LST deep-marine extent, such as shown in map 510.

At operation 640, an action is initiated for generating a deep-marine MFS extent from MFS map 304. At operation 642, a geoprocessing function is performed to query the MFS map 304 for deep-marine polygons, and dissolve the resulting polygons into a single polygon. At operation 644, a result of querying the MFS map 304 is output as the MFS deep-marine extent, such as shown in map 512.

At operation 650, a task is initiated to generate non-marine and subaerial extents. At operation 652, a geoprocessing function is performed to merge the subaerial extent (generated at operation 614) and the non-marine extents (generated at operation 624) for both LST and MFS. At operation 654, a result of merging the subaerial extent and the non-marine extents for both LST and MFS is output as the LST subaerial and non-marine extent, such as shown in map 514, and the MFS subaerial and non-marine extent, such as shown in map 516.

Figure 7B:
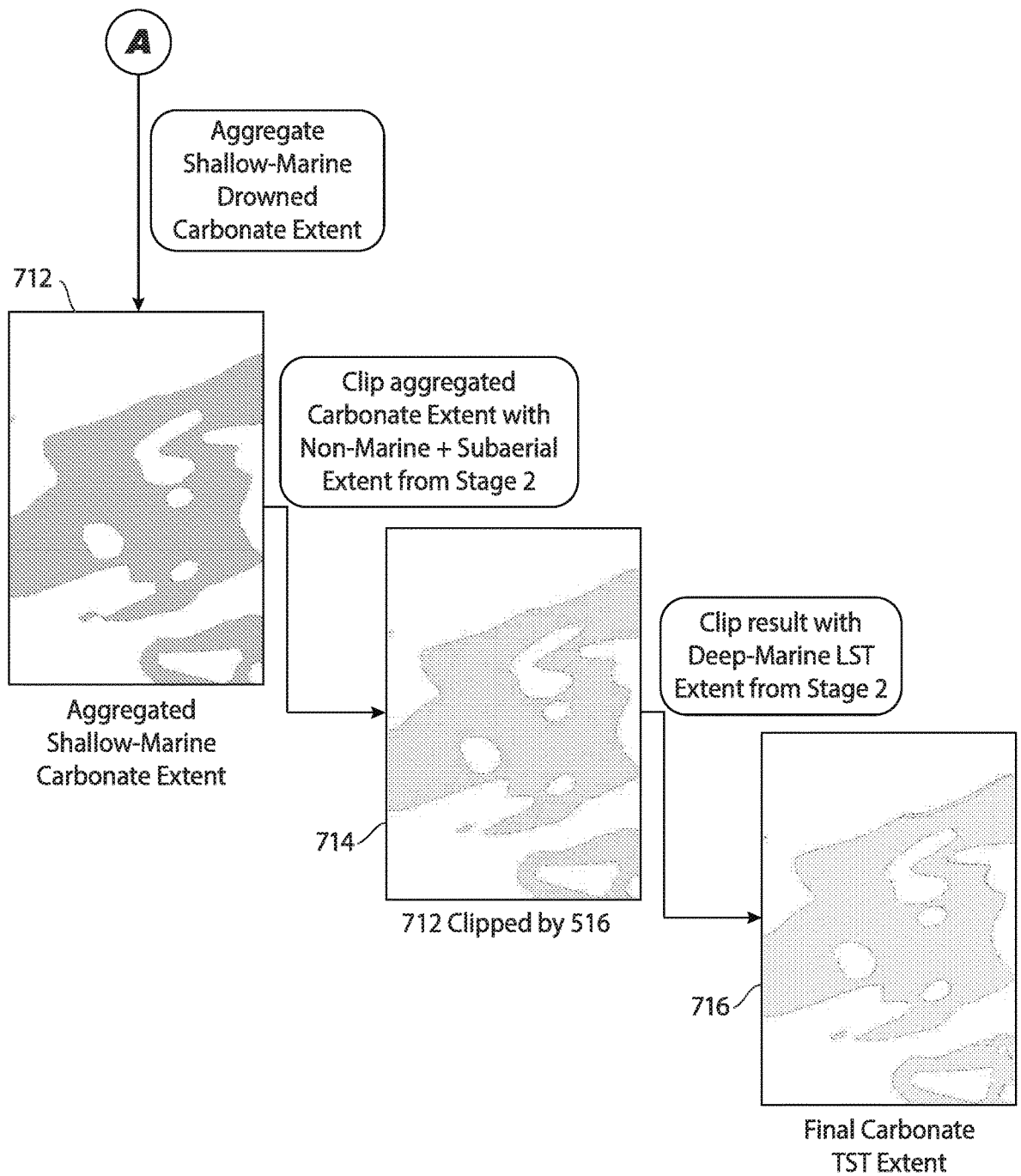
FIG. 7 shows a series of example maps that illustrate maps processed during a third stage of an example method executed by a TST extent generator in accordance with embodiments of the disclosure.
Figure 8:
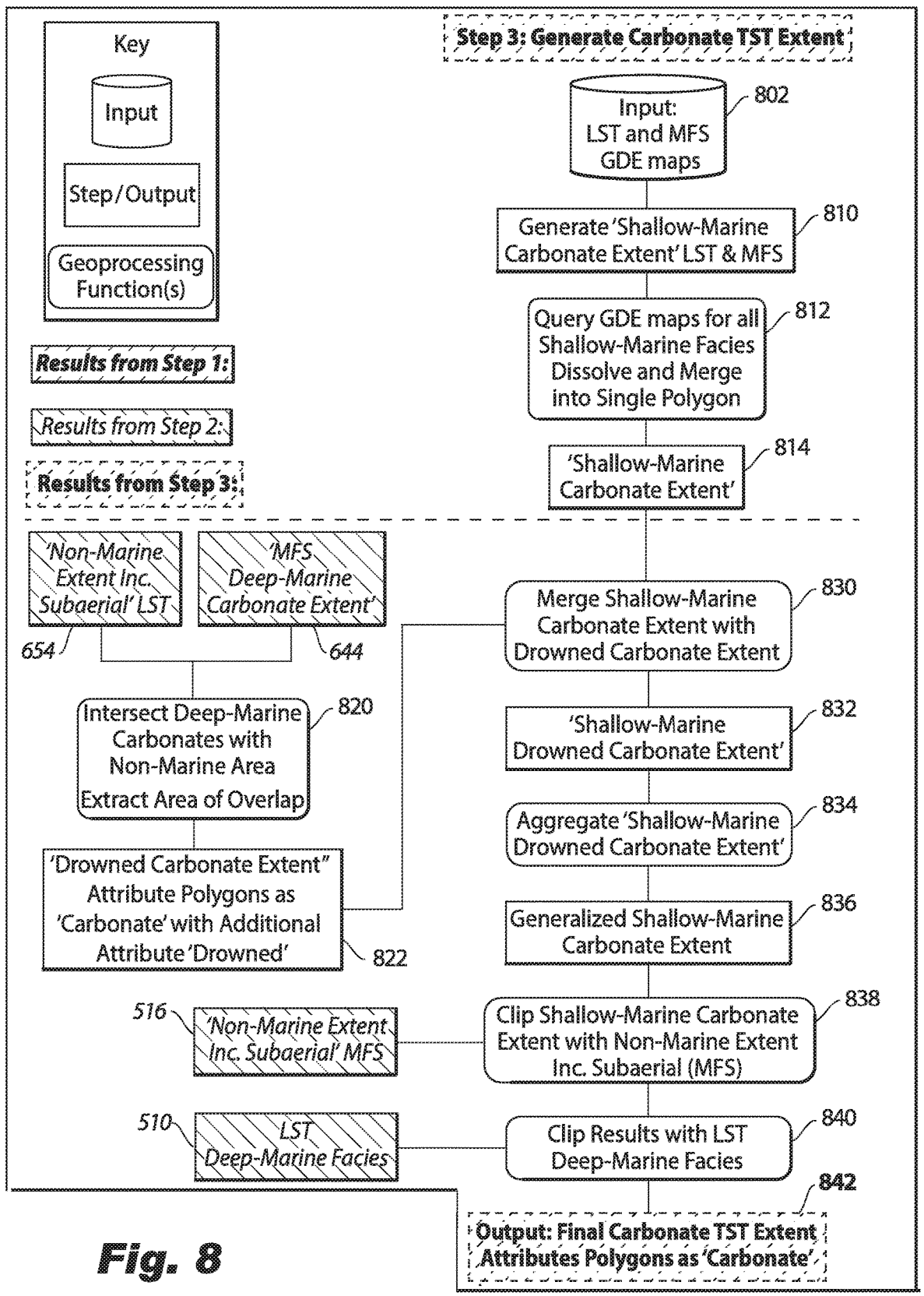
FIG. 8 shows a flowchart of example operations performed by the TST extent generator during the third stage of the example method executed by the TST extent generator in accordance with embodiments of the disclosure.

FIG. 7 shows a series of example maps that illustrate the third stage of the disclosed method, and FIG. 8 shows a flowchart of example operations of the third stage of the disclosed method. At the third stage, the MFS and LST maps 302 and 304 are queried for relevant facies and resulting polygons of each respective query is dissolved into a single polygon, which is then further processed and/or provided to the fourth stage for further processing.

With reference to FIG. 7, map 702 shows an LST shallow-marine carbonate extent that is the result of querying the input LST map 302 for shallow-marine carbonate facies and dissolving all polygons to form one polygon. Map 704 shows an MFS shallow-marine carbonate extent that is the result of querying the input MFS map 304 for shallow-marine carbonate facies and dissolving all polygons to form one polygon. Map 706 shows a shallow-marine carbonate combined extent that is a result of merging maps 702 and 704 for combining LST and MFS shallow-marine carbonate extents.

Map 708 shows an intersection of maps 512 and 514, showing an extent referred to as drowned carbonates. Map 710 shows a merge of maps 706 and 708. Map 712 shows an aggregation of the LST shallow-marine carbonate extent of map 702 and the MFS shallow-marine carbonate extent of map 704. Aggregation is a geoprocessing function that combines polygons within a specified distance of each other into new polygons and generalizes the original polygon. Generalising is a geoprocessing function in which a geometries complexity is reduced based on a selected algorithm. The selected algorithm removes vertices at selected intervals and reshapes the polygon boundaries accordingly. Map 714 shows a result of map 712 that was clipped using MFS subaerial and non-marine extent of map 516. Map 716 shows map 714 clipped using the LST deep-marine extent of map 510. The polygons of map 716 are assigned a carbonate attribute.

With reference to FIG. 8, at operation 802 input LST and MFS maps (e.g., LST and MFS maps 302, 304) are received. At operation 810, an action is initiated for generating shallow-marine carbonate extents from respective LST and MFS maps (e.g., LST map 302 and MFS map 304). At operation 812, a geoprocessing function is performed to query the GDE maps (e.g., LST and MFS maps 302, 304) for shallow-marine carbonate facies, and dissolve the resulting polygons into a single polygon. At operation 814, a result of querying the LST and MFS maps 302, 304 is output as the respective LST shallow-marine carbonate extent and the MFS shallow-marine carbonate extent, such as shown by maps 702 and 704.

At operation 820, LST subaerial and non-marine extent results from operation 654, such as shown in map 514, and MFS deep-marine extent from operation 644, such as shown in map 512, are processed by a geoprocessing intersection function to extract an area of overlap. The result is provided at operation 822 and the polygons attributed as shallow-marine carbonate with an additional attribute indicating that they are drowned carbonates.

At operation 830, a geoprocessing function is performed to merge the shallow-marine carbonate extent and the shallow-marine drowned carbonate extent for both LST and MFS. At operation 832, a result of the merge operation 830 is output as merged shallow-marine drowned carbonate extent, such as shown in map 710. At operation 834, a geoprocessing function is performed to aggregate shallow-marine drowned carbonate extent. The output of operation 834 is generalised and output at operation 836 such as shown in map 712.

At operation 838, the output of operation 836 is clipped by the MFS non-marine merged with subaerial extent, such as shown at map 516, using a geoprocessing clipping function, wherein an example of a result of operation 838 is shown in map 714. At operation 840, the result of operation 838 is clipped by the LST deep-marine extent, such as shown in map 510, using a geoprocessing clipping function. The result of operation 840 is output at operation 842, such as shown in map 716, wherein all of the polygons included in the output are assigned a carbonate attribute.

Figure 9:
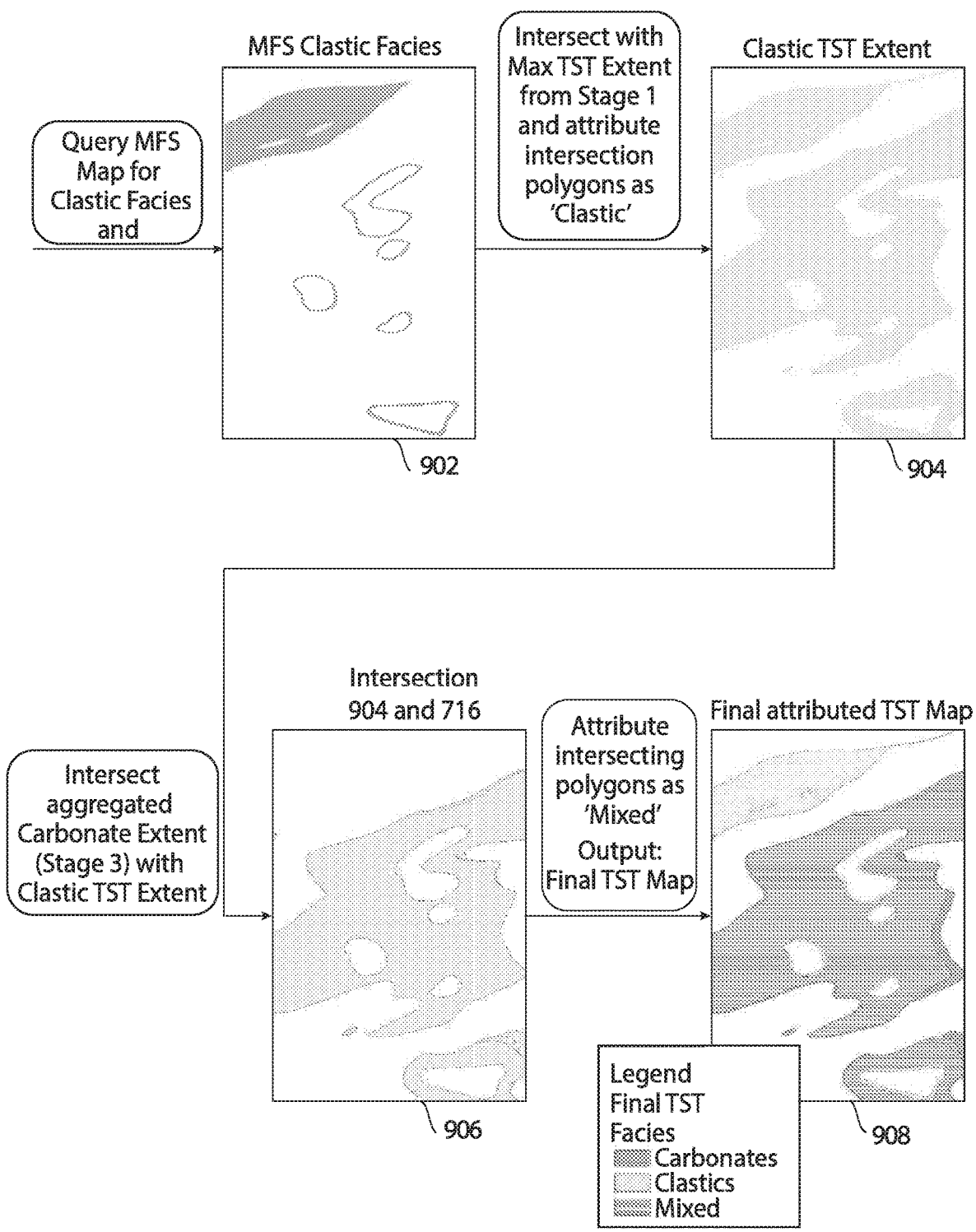
FIG. 9 shows a series of example maps that illustrate maps processed during a fourth stage of an example method executed by a TST extent generator in accordance with embodiments of the disclosure.
Figure 10:
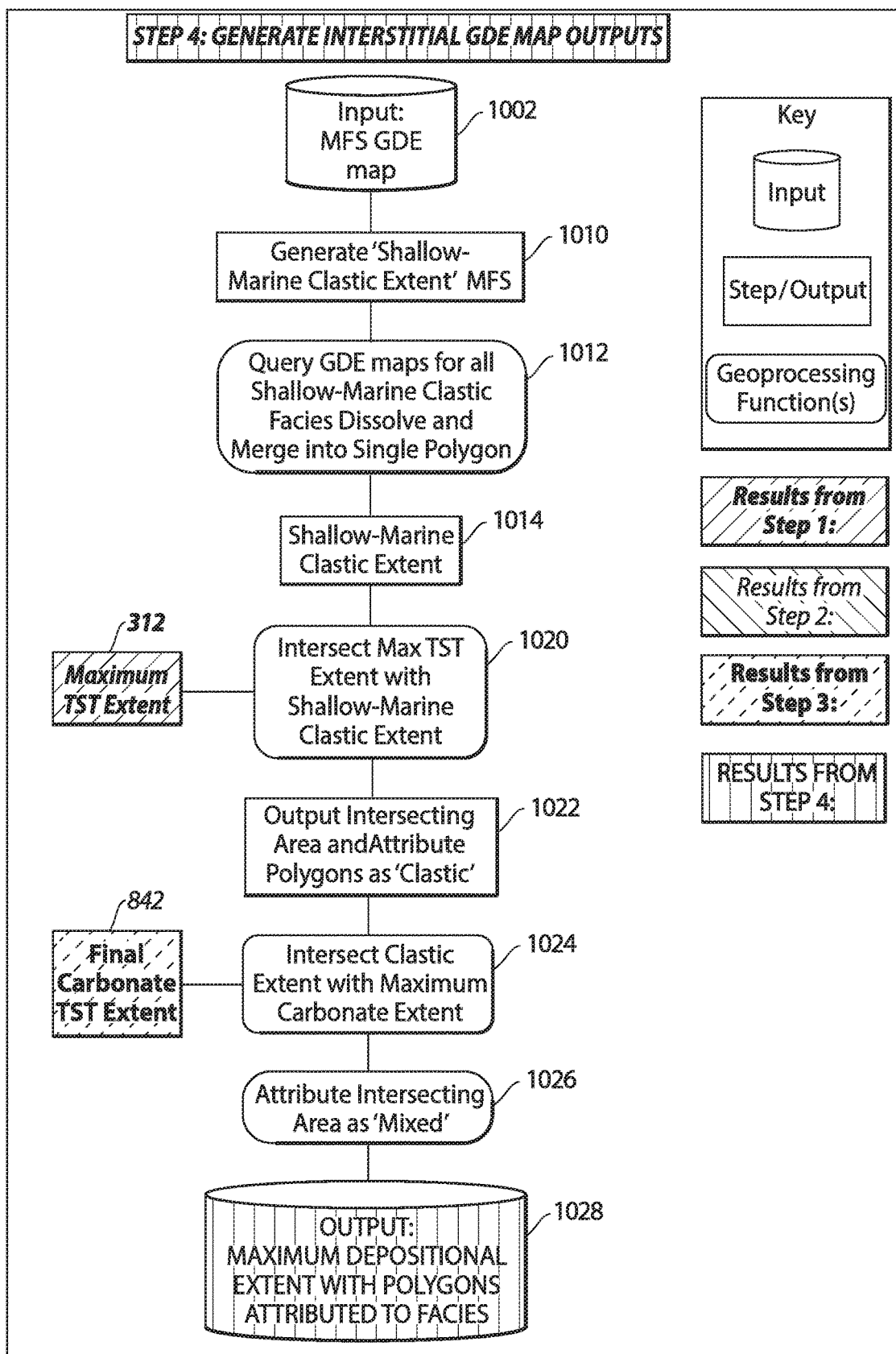
FIG. 10 shows a flowchart of example operations performed by the TST extent generator during the fourth stage of the example method executed by the TST extent generator in accordance with embodiments of the disclosure.

FIG. 9 shows a series of example maps that illustrate the fourth stage of the disclosed method, and FIG. 10 shows a flowchart of example operations of the fourth stage of the disclosed method. At the fourth stage, the MFS map 304 is queried for shallow-marine clastic facies and resulting polygons of each respective query is dissolved into a single polygon, which is then further processed in association with the output of the first and third stages and the results are provided as output.

With reference to FIG. 9, map 902 shows a result of querying the MFS map 304 for shallow-marine clastic facies after resulting polygons of each respective query are dissolved into a single polygon. Map 904 shows a result of intersecting map 902 with the maximum TST extent from the first stage 1, as shown in map 312 of FIG. 3. In map 904, the intersecting polygons are assigned a clastic attribute. Map 906 shows an intersection of map 904 and the aggregated carbonate extent (e.g., as shown in example map 716 determined at the third stage). Map 908 shows attributes for the polygons of the maximum TST extent shown in map 312. The carbonate or clastic attributes for respective polygons can be shown as a single attribute or as mixed when more than one attribute is assigned to that polygon.

With reference to FIG. 10, at operation 1002 an input MFS map (e.g., MFS map 304) is received. At operation 1010, an action is initiated for generating shallow-marine clastic extent from the MFS map (e.g., MFS map 304). At operation 1012, a geoprocessing function is performed to query the GDE map (e.g., MFS map 304) for shallow-marine clastic facies, and dissolve the resulting polygons into a single polygon. At operation 1014, a result of querying the MFS map is output as the shallow-marine clastic extent, such as shown by map 902.

At operation 1020, the shallow-marine clastic extent output at operation 1014, e.g., as shown in map 902, and the maximum TST extent (e.g., from operation 424 of FIG. and shown map 308 of FIG. 3) are processed by a geoprocessing intersection function to extract an area of overlap. At operation 1022, a result of operation 1020 is output, wherein each of the polygons of this output is assigned a clastic attribute.

At operation 1024, the output of operation 1022 and the maximum carbonate extent that was output by operation 842 (e.g., as shown in map 716) are processed by a geoprocessing intersection function to extract an area of overlap. At operation 1026, the intersecting polygons determined by operation 1024 are assigned a mixed attribute. At operation 1028, the maximum TST extent is output with each an indication of the attribute assigned to the polygons included in the maximum TST extent. Accordingly, at operations 842 of FIG. 8 and operations 1022 and 1026 of FIG. 10, attributes are applied to the TST map to show carbonate, clastic, and mixed attributes. Without access to these attributes, a user may be aware that rock may be present between the two end-member maps, and a TST extent would show the presence or rock, without differentiation between facies. However, it is the determination of the TST extent's facies that is a key differentiator and useful as input to the screening workflow, such as performed by screening system 120.

When performing basin screening, a user would be interested in the presence of reservoirs of a certain facies type. Therefore, knowledge of attributes of facies of the TST is useful for determining presence or absence of a potential reservoir in a subsurface, depending on the users input criteria. The carbonate and clastic attributes provided by this disclosure are useful for making such determinations. Additionally, the attribute "mixed" assigned at operation 1026 is useful for determining areas of exploration for which there is a higher risk of finding a reservoir.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
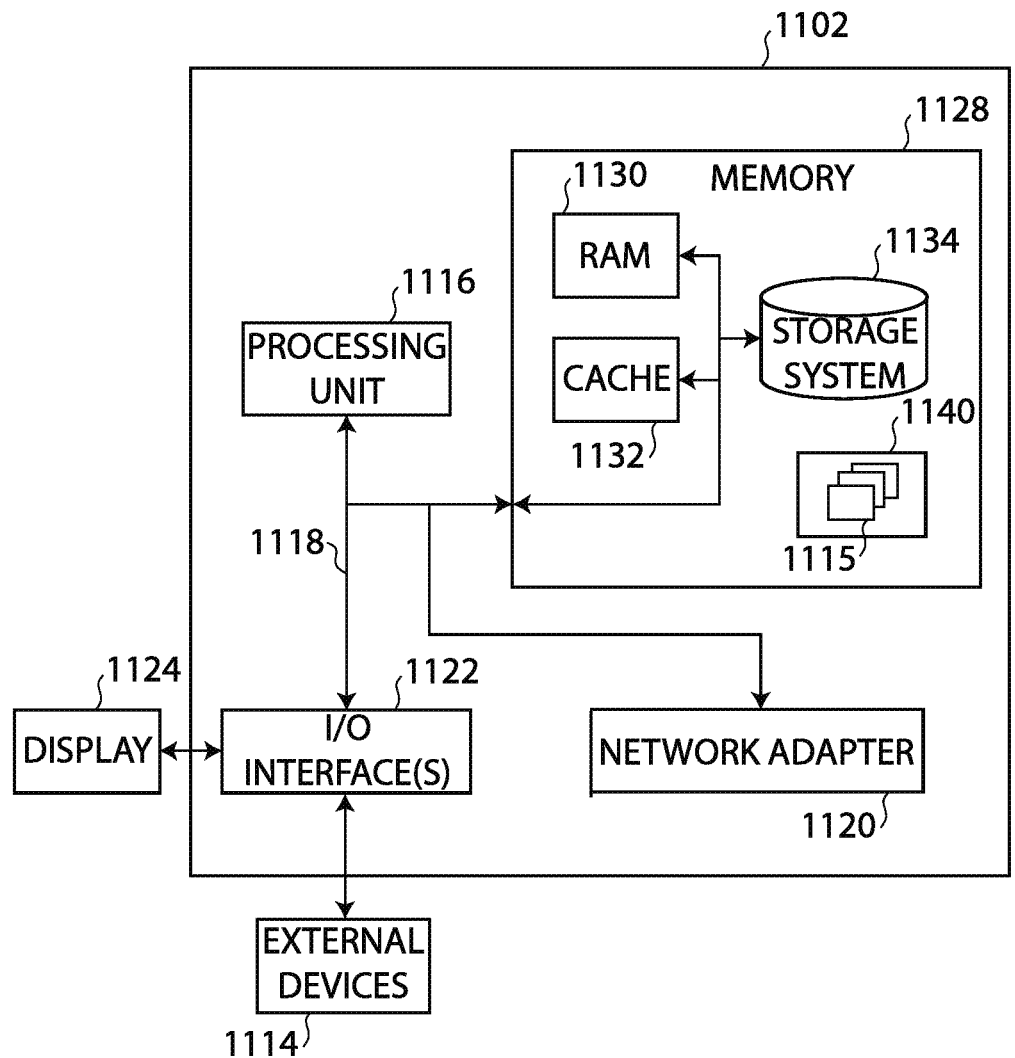
FIG. 11 shows a block diagram of an example computer system.

Embodiments processing performed by the TST extent generator 100 may be implemented or executed by one or more computer systems. For example, processing performed by the TST extent generator 100 can be implemented using a computer system such as example computer system 1102 illustrated in FIG. 11. In various embodiments, computer system 1102 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1102 is only one example of a suitable system and is not intended to suggest any limitation as to the scope of use or functionality of embodiments of the disclosure described herein. Regardless, computer system 1102 is capable of being implemented and/or performing any of the functionality set forth hereinabove.

Computer system 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system 1102 may be practiced in distributed data processing environments where tasks are performed by remote processing devices that are linked through a communications network. In a distributed data processing environment, program modules may be located in both local and remote computer system storage media including memory storage devices.

The components of computer system 1102 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1102 typically includes a variety of computer system readable media. Such media may be any available media that is accessible by the TST extent generator 100, and it includes both volatile and non-volatile media, removable and non-removable media.

System memory 1128 can include computer system readable media in the form of volatile memory, such as random access memory (RAM) 1130 and/or cache memory 1132. Computer system 1102 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the disclosure.

Program/utility 1140, having a set (at least one) of program modules 1115 may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1115 generally carry out the functions and/or methodologies of embodiments of the disclosure as described herein.

Computer system 1102 may also communicate with one or more external devices 1114 such as a keyboard, a pointing device, a display 1124, etc.; one or more devices that enable a user to interact with computer system 1002; and/or any devices (e.g., network card, modem, etc.) that enable the TST extent generator 100 to communicate with one or more other computing devices. Such communication can occur via Input/Output (I/O) interfaces 1122. Still yet, computer system 1102 can communicate with one or more networks such as a local area network (LAN), a general wide area network (WAN), and/or a public network (e.g., the Internet) via network adapter 1120. As depicted, network adapter 1120 communicates with the other components of the TST extent generator 100 via bus 1118. It should be understood that although not shown, other hardware and/or software components could be used in conjunction with computer system 1102. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, in accordance with aspects of the disclosure, a method implemented by a computer, to process gross depositional environment (GDE) maps is provided. The method includes receiving end-member LST and MFS GDE maps that represent a particular geographic area at different respective times spaced by a time interval. The method further includes processing both of the LST and MFS GDE maps in accordance with a predefined set of rules that use geoprocessing operations to relate the content of both the LST and MFS GDE maps and outputting a transgressive system tract (TST) map based on the processing.

The embodiments of any preceding paragraph or combination thereof, and processing both of the LST and MFS GDE maps in accordance with a predefined set of rules further including, from both the LST and MFS GDE maps, determining an extent of a maximum TST and determining any portions of the maximum TST extent that represent a carbonate extent. In addition processing both of the LST and MFS GDE maps in accordance with the predefined set of rules can include determining any portions of the maximum TST extent that represent a clastic extent and determining any portions of the maximum TST extent that represent both the carbonate and clastic extents. The TST map can include representations of the maximum TST extent, portions of the maximum TST extent that represent the carbonate extent, portions of the maximum TST extent that represent the clastic extent, and portions of the maximum TST extent that represent both the carbonate and clastic extents.

The embodiments of any preceding paragraph or combination thereof, and processing both of the LST and MFS GDE maps in accordance with a predefined set of rules can include, from both the LST and MFS GDE maps, determining an extent of the maximum TST. Assigning maximum TST as a first facies attribute to a first polygon result of the determination of the extent of the maximum TST, from the MFS map and determining a first type of extent. Further included can be determining a first intersection of the maximum TST extent and the first type of extent assigning a second facies attribute to a second polygon result of the first intersection and determining from both the LST and MFS GDE maps a second type of extent. Further included can be determining a second intersection of the second type of extent and the second polygon result of the first intersection and assigning a third facies attribute to a third polygon result of the second intersection. The TST map can include the first, second, and third polygons results having their assigned respective first, second, and third facies attributes.

The embodiments of any preceding paragraph or combination thereof, and determining the extent of the maximum TST extent of the TST map including querying by a first query each of the LST and MFS GDE maps for relevant facies. Further included can be, for each of the LST and GDE maps, dissolving polygon results of the first query into a max TST single polygon. Further included can be determining a third intersection of the max TST single polygon of the respective MFS and LST maps. Non-intersecting areas of the third intersection can be determined to be the maximum TST extent of the TST map. In embodiments, the relevant facies can be marine facies.

The embodiments of any preceding paragraph or combination thereof, and the first type of extent can be a shallow-marine carbonate extent, and determining the shallow-marine carbonate extent can include querying by a second query the MFS GDE map for shallow-marine carbonate facies, dissolving polygon results of the second query into a shallow-marine carbonate single polygon, and outputting the shallow-marine carbonate single polygon as shallow-marine carbonate extent.

The embodiments of any preceding paragraph or combination thereof, and the second type of extent can be a maximum carbonate extent, and determining the maximum carbonate extent can include querying by a third query the LST GDE map for deep-marine facies and dissolving polygon results of the third query into a deep-marine single polygon. Further included can be outputting the deep-marine single polygon as an LST deep-marine extent and querying by a fourth query the MFS GDE map for deep-marine facies. Further included can be dissolving polygon results of the fourth query into a deep-marine single polygon and outputting the deep-marine single polygon as an MFS deep-marine extent. Further included can be determining a merged non-marine and subaerial extent to be a merged extent and determining a fourth intersection of the MFS deep-marine extent and the merged non-marine and subaerial extent. Further included can be extracting an overlapping area of the fourth intersection and outputting the extracted overlapping area as a drowned carbonate extent. Further included can be merging by a first merge the drowned carbonate extent with the shallow-marine carbonate extent into a second merged extent and aggregating the merged non-marine and subaerial extent into an aggregated extent by combining polygons in the merged extent that are within a specified distance of each other into new polygons. Further included can be generalizing the aggregated extent into a generalised extent and clipping by a first clip the generalised extent with the merged extent into a clipped extent. Further included can be clipping by a second clip extent result of the first clip with LST deep-marine facies into a final carbonate TST extent and outputting the final carbonate TST extent.

The embodiments of any preceding paragraph or combination thereof, and determining the merged non-marine and subaerial extent include querying by a fifth query the LST and MFS GDE maps for subaerial attributed polygons and dissolving polygon results of the fifth query into a subaerial single polygon. Further included can be outputting the subaerial single polygon as a subaerial extent and querying by a sixth query the LST and MFS GDE maps for non-marine facies. Further included can be dissolving polygon results of the sixth query into a non-marine single polygon and outputting the non-marine single polygon as a non-marine extent. Further included can be merging by a second merge the subaerial single polygon and the non-marine single polygon and outputting a result of the second merge as the merged non-marine and subaerial extent.

The embodiments of any preceding paragraph or combination thereof, and the first type of extent can be a shallow-marine clastic extent. Determining the shallow-marine clastic extent can include querying by a seventh query the MFS GDE map for shallow-marine clastic facies and dissolving polygon results of the seventh query into a shallow-marine clastic single polygon that is output as the first type of extent, and the first type of extent is a shallow-marine clastic extent.

The embodiments of any preceding paragraph or combination thereof, and the TST map is provided as input to a second computing system for assessing underground fluid reservoir potential for selecting a formation to explore for an underground fluid reservoir.

The embodiments of any preceding paragraph or combination thereof, and the method can further include inputting the TST map to the second computing system and selecting the formation to explore.

The embodiments of any preceding paragraph or combination thereof, and the method can include guiding and/or controlling exploration of the selected formation.

In accordance with aspects of the disclosure, a TST generator for processing GDE maps is provided. The TST generator includes a memory storing programmable instructions and a processing device that when executing the programmable instructions is configured to perform operations for performing the method of the disclosure, including the different embodiments of combinations thereof.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method, implemented by a computer, of processing gross depositional environment (GDE) maps, the method comprising:
   receiving end-member lowstand systems tract (LST) and maximum flood surface (MFS) gross depositional environment (GDE) maps that represent a particular geographic area at different respective times spaced by a time interval;
   processing both of the LST and MFS GDE maps in accordance with a predefined set of rules that use geoprocessing operations to relate content of both the LST and MFS GDE maps, the processing comprising:
   from both the LST and MFS GDE maps, determining an extent of a maximum transgressive system tract (TST);
   determining any portions of the maximum TST extent that represent a carbonate extent;
   determining any portions of the maximum TST extent that represent a clastic extent; and
   determining any portions of the maximum TST extent that represent both the carbonate and clastic extents; and
   outputting a TST map based on the processing, wherein the TST map includes representations of the maximum TST extent, portions of the maximum TST extent that represent the carbonate extent, portions of the maximum TST extent that represent the clastic extent, and portions of the maximum TST extent that represent both the carbonate and clastic extents.

2. The method of claim 1, wherein processing both of the LST and MFS GDE maps in accordance with a predefined set of rules comprises:
   assigning the maximum TST as a first facies attribute to a first polygon result of the determination of the extent of the maximum TST;
   from the MFS GDE map determining a first type of extent;
   determining a first intersection of the maximum TST extent and the first type of extent;
   assigning a second facies attribute to a second polygon result of the first intersection;
   determining from both the LST and MFS GDE maps a second type of extent;
   determining a second intersection of the second type of extent and the second polygon result of the first intersection; and
   assigning a third facies attribute to a third polygon result of the second intersection,
   wherein the TST map includes the first, second, and third polygons results having their assigned respective first, second, and third facies attributes.

3. The method of claim 2, wherein determining the extent of the maximum TST extent of the TST map comprises:
   querying by a first query each of the LST and MFS GDE maps for relevant facies;
   for each of the LST and GDE maps, dissolving polygon results of the first query into a max TST single polygon; and
   determining a third intersection of the max TST single polygon of the respective MFS GDE and LST maps, wherein non-intersecting areas of the third intersection are determined to be the maximum TST extent of the TST map.

4. The method of claim 3, wherein the relevant facies are marine facies.

5. The method of claim 3, wherein the first type of extent is a shallow-marine carbonate extent, and determining the shallow-marine carbonate extent comprises:
   querying by a second query the MFS GDE map for shallow-marine carbonate facies;
   dissolving polygon results of the second query into a shallow-marine carbonate single polygon; and
   outputting the shallow-marine carbonate single polygon as shallow-marine carbonate extent.

6. The method of claim 5, wherein the second type of extent is a maximum carbonate extent, and determining the maximum carbonate extent comprises:
   querying by a third query the LST GDE map for deep-marine facies;
   dissolving polygon results of the third query into a deep-marine single polygon;

outputting the deep-marine single polygon as an LST deep-marine extent;
querying by a fourth query the MFS GDE map for deep-marine facies;
dissolving polygon results of the fourth query into a deep-marine single polygon;
outputting the deep-marine single polygon as an MFS deep-marine extent;
determining a merged non-marine and subaerial extent to be a merged extent;
determining a fourth intersection of the MFS deep-marine extent and the merged non-marine and subaerial extent;
extracting an overlapping area of the fourth intersection;
outputting the extracted overlapping area as a drowned carbonate extent;
merging by a first merge the drowned carbonate extent with the shallow-marine carbonate extent into a second merged extent;
aggregating the merged non-marine and subaerial extent into an aggregated extent by combining polygons in the merged extent that are within a specified distance of each other into new polygons;
generalizing the aggregated extent into a generalised extent;
clipping by a first clip the generalised extent with the merged extent into a clipped extent;
clipping by a second clip extent result of the first clip with LST deep-marine facies into a final carbonate TST extent; and
outputting the final carbonate TST extent.

7. The method of claim 6, wherein determining the merged non-marine and subaerial extent comprises:
querying by a fifth query the LST and MFS GDE maps for subaerial attributed polygons;
dissolving polygon results of the fifth query into a subaerial single polygon;
outputting the subaerial single polygon as a subaerial extent;
querying by a sixth query the LST and MFS GDE maps for non-marine facies;
dissolving polygon results of the sixth query into a non-marine single polygon;
outputting the non-marine single polygon as a non-marine extent;
merging by a second merge the subaerial single polygon and the non-marine single polygon; and
outputting a result of the second merge as the merged non-marine and subaerial extent.

8. The method of claim 6, wherein the first type of extent is a shallow-marine clastic extent, and determining the shallow-marine clastic extent comprises:
querying by a seventh query the MFS GDE map for shallow-marine clastic facies; and
dissolving polygon results of the seventh query into a shallow-marine clastic single polygon that is output as the first type of extent, and the first type of extent is a shallow-marine clastic extent.

9. The method of claim 1, wherein the TST map is provided as input to a second computing system for assessing underground fluid reservoir potential for selecting a formation to explore for an underground fluid reservoir.

10. The method of claim 9, further comprising:
inputting the TST map to the second computing system; and
selecting the formation to explore.

11. The method of claim 9, further comprising exploring the selected formation.

12. A transgressive system tract (TST) generator for processing gross depositional environment (GDE) maps, TST generator comprising:
a memory storing programmable instructions;
a processing device that when executing the programmable instructions is configured to perform operations, the operations comprising:
receiving end-member lowstand systems tract (LST) and maximum flood surface (MFS) gross depositional environment (GDE) maps that represent a particular geographic area at different respective times spaced by a time interval;
processing both of the LST and MFS GDE maps in accordance with a predefined set of rules that use geoprocessing operations to relate content of both the LST and MFS GDE maps, the processing comprising:
from both the LST and MFS GDE maps, determining an extent of a maximum TST;
determining any portions of the maximum TST extent that represent a carbonate extent;
determining any portions of the maximum TST extent that represent a clastic extent; and
determining any portions of the maximum TST extent that represent both the carbonate and clastic extents; and
outputting a transgressive system tract (TST) map based on the processing, wherein the TST map includes representations of the maximum TST extent, portions of the maximum TST extent that represent the carbonate extent, portions of the maximum TST extent that represent the clastic extent, and portions of the maximum TST extent that represent both the carbonate and clastic extents.

13. The TST generator of claim 12, wherein processing both of the LST and MFS GDE maps in accordance with a predefined set of rules comprises:
assigning the maximum TST as a first facies attribute to a first polygon result of the determination of the extent of the maximum TST;
from the MFS GDE map determining a first type of extent;
determining a first intersection of the maximum TST extent and the first type of extent;
assigning a second facies attribute to a second polygon result of the first intersection;
determining from both the LST and MFS GDE maps a second type of extent;
determining a second intersection of the second type of extent and the second polygon result of the first intersection; and
assigning a third facies attribute to a third polygon result of the second intersection,
wherein the TST map includes the first, second, and third polygons results having their assigned respective first, second, and third facies attributes.

14. The TST generator of claim 13, wherein determining the extent of the maximum TST extent of the TST map comprises:
querying by a first query each of the LST and MFS GDE maps for relevant facies;
for each of the LST and GDE maps, dissolving polygon results of the first query into a max TST single polygon; and
determining a third intersection of the max TST single polygon of the respective MFS GDE and LST maps, wherein non-intersecting areas of the third intersection are determined to be the maximum TST extent of the TST map, and wherein the first type of extent is a shallow-marine carbonate extent, and determining the shallow-marine carbonate extent comprises:
  querying by a second query the MFS GDE map for shallow-marine carbonate facies;
  dissolving polygon results of the second query into a shallow-marine carbonate single polygon; and
  outputting the shallow-marine carbonate single polygon as shallow-marine carbonate extent.

15. The TST generator of claim 14, wherein the second type of extent is a maximum carbonate extent, and determining the maximum carbonate extent comprises:
  querying by a third query the LST GDE map for deep-marine facies;
  dissolving polygon results of the third query into a deep-marine single polygon;
  outputting the deep-marine single polygon as an LST deep-marine extent;
  querying by a fourth query the MFS GDE map for deep-marine facies;
  dissolving polygon results of the fourth query into a deep-marine single polygon;
  outputting the deep-marine single polygon as an MFS deep-marine extent;
  determining a merged non-marine and subaerial extent to be a merged extent;
  determining a fourth intersection of the MFS deep-marine extent and the merged non- marine and subaerial extent;
  extracting an overlapping area of the fourth intersection;
  outputting the extracted overlapping area as a drowned carbonate extent;
  merging by a first merge the drowned carbonate extent with the shallow-marine carbonate extent into a second merged extent;
  aggregating the merged non-marine and subaerial extent into an aggregated extent by combining polygons in the merged extent that are within a specified distance of each other into new polygons;
  generalizing the aggregated extent into a generalised extent;
  clipping by a first clip the generalised extent with the merged extent into a clipped extent;
  clipping by a second clip extent result of the first clip with LST deep-marine facies into a final carbonate TST extent; and
  outputting the final carbonate TST extent.

16. The TST generator of claim 15, wherein determining the merged non- marine and subaerial extent comprises:
  querying by a fifth query the LST and MFS GDE maps for subaerial attributed polygons;
  dissolving polygon results of the fifth query into a subaerial single polygon;
  outputting the subaerial single polygon as a subaerial extent;
  querying by a sixth query the LST and MFS GDE maps for non-marine facies;
  dissolving polygon results of the sixth query into a non-marine single polygon;
  outputting the non-marine single polygon as a non-marine extent;
  merging by a second merge the subaerial single polygon and the non-marine single polygon; and
  outputting a result of the second merge as the merged non-marine and subaerial extent.

17. The TST generator of claim 15, wherein the first type of extent is a shallow-marine clastic extent, and determining the shallow-marine clastic extent comprises:
  querying by a seventh query the MFS GDE map for shallow-marine clastic facies; and
  dissolving polygon results of the seventh query into a shallow-marine clastic single polygon that is output as the first type of extent, and the first type of extent is a shallow-marine clastic extent.

18. A non-transitory computer readable storage medium and one or more computer programs embedded therein, the computer programs comprising instructions, which when executed by a computer system, cause the computer system to:
  receive end-member lowstand systems tract (LST) and maximum flood surface (MFS) gross depositional environment (GDE) maps that represent a particular geographic area at different respective times spaced by a time interval;
  process both of the LST and MFS GDE maps in accordance with a predefined set of rules that use geoprocessing operations to relate content of both the LST and MFS GDE maps, the processing comprising:
    from both the LST and MFS GDE maps, determining an extent of a maximum TST;
    determining any portions of the maximum TST extent that represent a carbonate extent;
    determining any portions of the maximum TST extent that represent a clastic extent; and
    determining any portions of the maximum TST extent that represent both the carbonate and clastic extents; and
  output a transgressive system tract (TST) map based on the processing, wherein the TST map includes representations of the maximum TST extent, portions of the maximum TST extent that represent the carbonate extent, portions of the maximum TST extent that represent the clastic extent, and portions of the maximum TST extent that represent both the carbonate and clastic extents.

* * * * *